United States Patent

Villers et al.

[15] 3,677,495

[45] July 18, 1972

[54] TAPE RETAINING REEL CARTRIDGE

[72] Inventors: Walter H. Villers, Chicago; Ernest B. Johnson, Niles, both of Ill.

[73] Assignee: Ampex Corporation, Redwood City, Calif.

[22] Filed: March 5, 1971

[21] Appl. No.: 121,503

[52] U.S. Cl. .................................242/197, 206/53, 242/195

[51] Int. Cl. ......................................................G11b 23/10

[58] Field of Search..................242/197, 198, 199, 200, 195, 242/192, 54.1, 210, 74, 74.1, 74.2; 274/4 B, 4 C, 11 B 11 C; 179/100.22; 352/72, 78; 206/53, 52

[56] References Cited

UNITED STATES PATENTS

| | | | |
|---|---|---|---|
| 3,006,650 | 10/1961 | Ellmore | 242/197 UX |
| 3,468,497 | 9/1969 | Kelley | 242/192 |
| 3,591,102 | 7/1971 | Keiner | 242/74 |

FOREIGN PATENTS OR APPLICATIONS

| | | | |
|---|---|---|---|
| 881,270 | 11/1961 | Great Britain | 242/195 |

*Primary Examiner*—George F. Mautz
*Attorney*—Robert G. Clay

[57] ABSTRACT

A tape retaining reel cartridge, of the type including a hub and two side flanges, has spaced lips at the periphery of each flange to retain a leader attached to tape that is wound upon the hub. The lips are staggered so that the lips of one flange axially confront the spaces between the lips of the other flange. In one embodiment the flanges have radial cuts between the lips and spaces so that the lips can flex when the leader is tripped off the reel. The tape is narrower than the leader and passes freely between the lips. The lip sectors of the flanges are relieved to increase flexibility. The flanges are formed with circumferential ledges to hold the leader axially outwardly, and portions of the flanges between the ledges and the lips are formed to sloping shape to urge the leader radially inwardly. In another embodiment, the reel is mounted inside a housing, with a stripper for the leader that permits stripping only when the housing is mounted on a suitable transport mechanism.

10 Claims, 7 Drawing Figures

INVENTORS
WALTER H. VILLIERS
ERNEST B. JOHNSON
BY Robert H. Clay
ATTORNEY

*INVENTORS*
WALTER H. VILLIERS
ERNEST B. JOHNSON
BY Robert H. Clay
ATTORNEY

TAPE RETAINING REEL CARTRIDGE

BACKGROUND OF THE INVENTION

This invention relates to tape cartridges, and particularly to such cartridges including a reel and a tape leader.

Previously in the art, tape cartridges have consisted of a generally rectangular housing in which a tape winding hub is mounted for rotation, or of a reel including a hub and side flanges having confronting peripheral lips for retaining a leader wider than the tape, or of a combination of these two structures. In the reel type cartridge, the lips may scallop the edges of the tape leader if the leader is stripped off by hand, as by pulling the leader in a direction radially away from the reel. This effect is all the more severe as the axial dimension of the lips is increased, and when molded plastic material is used for the flanges the axial lip dimension must be thus increased to counter dimensional tolerance errors that cannot be avoided in the manufacturing process.

Accordingly, it is an object of the invention to provide a tape reel or cartridge that will retain a leader on the reel without danger of damaging the leader when the leader is stripped off.

It is another object of the invention to provide the above described effect while at the same time countering dimensional tolerance errors that are unavoidable when the apparatus is made of molded plastic.

Other objects and advantages will be explained in the course of the following description.

DETAILED DESCRIPTION OF THE INVENTION

Figures 1, 2, 3, 4, 5:
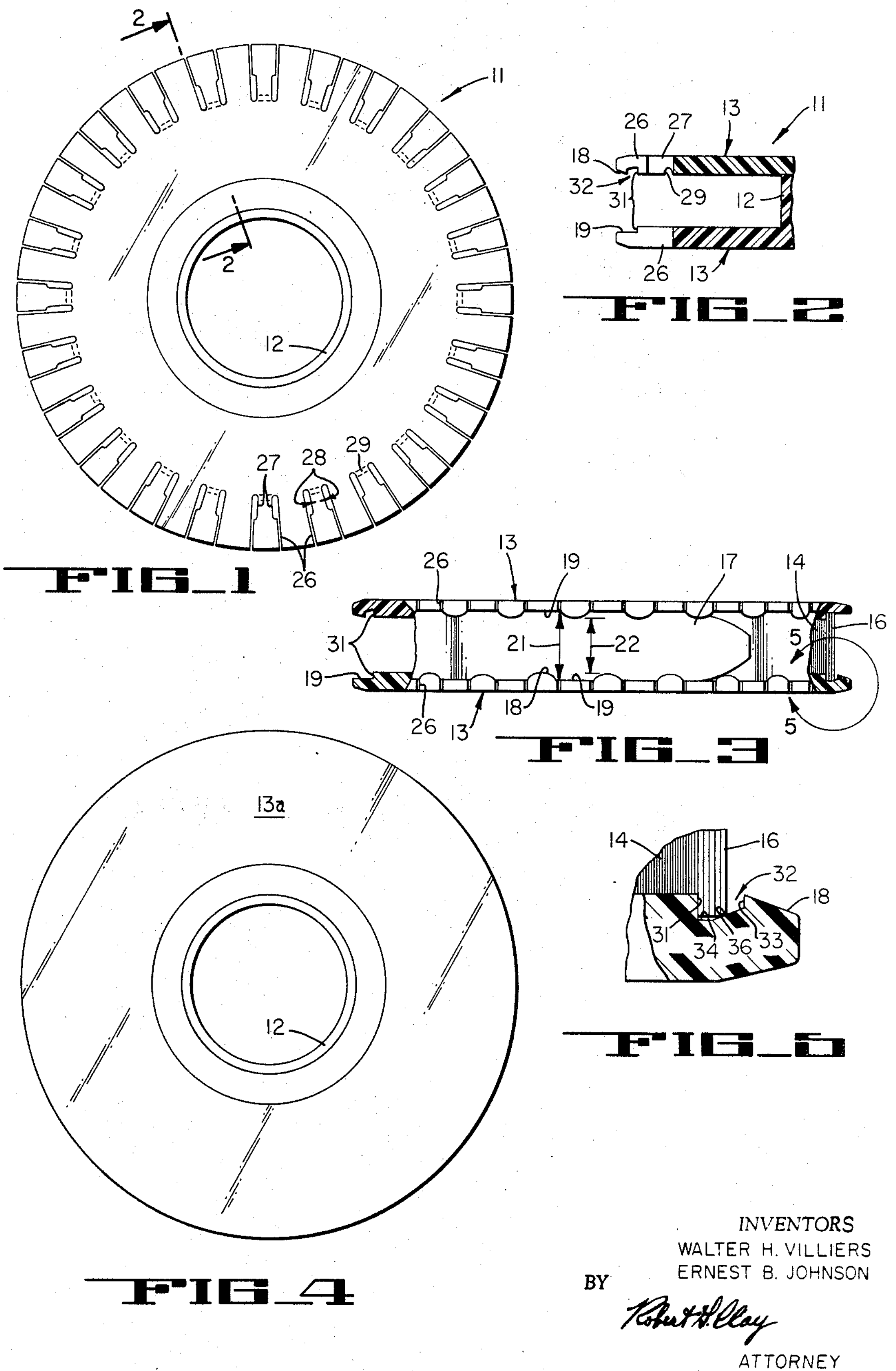
FIG. 1 is a plan view of a tape reel embodying one form of the invention.
FIG. 2 is a sectional view taken along the plane of lines 2—2 of FIG. 1.
FIG. 3 is a broken away elevation view of the embodiment of FIG. 1.
FIG. 4 is a plan view of another embodiment of the invention.
FIG. 5 is an enlarged view of the portion enclosed in lines 5—5 of FIG. 4.

Referring now to the drawing, and particularly to FIG. 1 thereof, there is shown a reel 11 for use, e.g., in a self-threading magnetic tape transport of the type disclosed in commonly assigned co-pending U.S. Pat. Application Ser. No. 66,497, "Tape Reel and Hub Assembly," filed Aug. 24, 1970 by Raymond C. Siebert.

As shown in FIG. 2, and also in FIG. 3, the reel 11 has a hub 12 and a pair of side flanges 13; and a tape 14 is wound on the hub between the flanges and terminates in a relatively stiffer leader 16 having a somewhat pointed tip 17.

To retain the leader on the reel when it is not in use, the flanges 13 are provided with discrete serrated lips 18, which are spaced apart by spaces 19 of arcuate dimension equal to that of the lips 18; and the leader 16 is given a width slightly less than the flange spacing 21, but greater than the axial dimension 22 between the rotational planes of the lips 18, while the tape 14 is given a width slightly less than the dimension 22 so as to pass freely between the lips during the winding and unwinding process.

Now if the lips 18 formed continuous rims peripherally around the flanges as in the invention of Ser. No. 66,497, previously mentioned, the leader 16 and tape would be adequately retained when not in use, and would be satisfactorily stripped and unwound from the reel by the automatic stripping, threading and winding mechanism of the tape transport. However, it has been found in practice that unskilled or uninformed operators may sometimes strip the leader from the reel by hand, when it is not on the machine, not for any useful purpose but merely out of curiosity. When such hand stripping is carelessly or brusquely performed with a reel having continuous peripheral lips, the leader is pulled in a radial direction from between the lips and makes a sharp, substantially 90° bend at the point where it leaves the reel. Since the lips of a continuous-lip reel are everywhere spaced axially apart for a shorter dimension (e.g., 22) that the width of the leader (e.g., 21), the result is often a severe scalloping of the edges of the leader. In other words, the edge regions of the leader are stretched in the direction of the leader length and beyond the elastic limit of the leader material, so that the edges are permanently deformed and assume a wavy pattern when viewed along the plane of the straightened leader, like the edges of a scallop shell. This deformation can seriously interfere with the tape-retaining function and the automatic stripping and threading function of the tape transport.

While it has been found that decreasing the axial dimension of the lips of a continuous-lip reel (Ser. No. 66,497) can have the effect of decreasing scalloping on mis-use, there is a competing phenomenon that demands a greater such dimension rather than a smaller one, when the reel is to be made of molded plastic, as is substantially mandatorily required by the competitive conditions of the contemporary tape transport art. When molded plastic is used, it is extremely difficult to manufacture reels of the class described so that the flanges and lips are everywhere spaced apart for a precise axial dimension. A certain variation in this spacing is unavoidable, and this variation is of such magnitude that the continuous lips must have axial dimensions great enough to cause significant scalloping damage to the leader when it is mis-used as above described.

Accordingly, it is a conception of the present invention to employ discrete serrated lips such as the lips 18, and particularly to stagger the lips 18 as shown in FIG. 3 so that the lips 18 of one flange 13 axially confront the spaces 19 of the other flange 13.

Such a construction has the advantage that the leader 16 does not have to be bowed transversely in order to be stripped from the reel. Instead, it tends to twist slightly about its longitudinal axis, first in one direction while clearing one lip 18, and then in the other direction while clearing the next lip 18, and so on. For example, in FIG. 3, if one were looking along the longitudinal axis of the leader from a position downstream from the tip 17 thereof as the leader comes tangentially off the reel, the leader would appear to twist slightly clockwise as it comes off each of the upper flange lips 18, and slightly counterclockwise as it comes off each of the lower flange lips 18. The peripheral axially inward portion of each lip 18 is smoothly curved to avoid corners that would cut the leader. The result is that scalloping is substantially avoided even when the leader is stripped from the reel by hand.

A second advantage of the above described staggered construction is that the tip 17 of the leader never projects tangentially beyond the pointed portion thereof, whereas if the lips 18 were directly opposed to one another, the tip might project at times for a distance equal to the length of the pointed portion plus the equivalent of the arcuate dimension of one of the spaces 19. In actual use in a self threading transport, it is important to be able to limit the projection of the leader tip so that it properly engages the stripping finger or mechanism, but does not project so far as to catch on other portions of the machine, and particularly not beyond the circumferential envelope of the reel so as accidentally to initiate stripping during handling of the reel off the machine.

It will be readily appreciated that a third advantage of the staggered construction is that the axial dimension of the lips 18 can be increased so as to counteract dimensional tolerance variations in the plastic molded structure, without danger of scalloping the leader edges.

As described thus far, the reel may also be represented by the view of FIG. 4, in which the side flanges 13a are of solid construction, and by an elevation view similar to that of FIG. 3 but without the radial cuts 26 which also show in FIGS. 1 and 2. The cuts 26 are made between each lip 18 and the adjacent spaces 19 to give flexibility to the lip as the leader is stripped off.

Making the lips 18 flexible in this manner means that the axial dimension of the lips 18 can be further increased to counter molding inaccuracies, without danger of scalloping the leader edges.

To further increase the flexibility of the lips 18, the cuts 26 may be enlarged as at 27 to define a narrowed neck 28 for the lip sectors; and the radially and axially inward sides of the lip sectors may be relieved as by forming therein a groove 29.

Ordinarily it is desired to retain the leader near the outer periphery of the reel even if the tape pack is of smaller diameter. Accordingly, a circumferential ledge 31 is formed in each side flange for this purpose. The ledge may be defined as one wall of a circumferential groove 32, the opposite wall 33 of which appears only in the lips 18 and is axially directed to retain the leader, and the bottom 34 of which is spaced from the bottom of the opposite groove for the dimension 21 slightly greater than the leader width. In the regions of the spaces 19, the bottoms 34 of the grooves 32 are coextensive with the flange sectors of the spaces. Radially inwardly from the grooves 32, the flanges are spaced apart for the dimension 22, slightly greater than the tape width.

To assist the ledge 31 in retaining the leader at a desired minimum diameter, the diameter of the ledge 31 may be predetermined to be the normal operating diameter of the tape pack 14.

To help retain the leader 16 securely on the lips 18, it has been found useful to form the bottom 34 of the groove 32 to a sloping surface 36 (FIG. 5) at least in the areas of the lips 18.

The above described structure of the grooves 32 has another useful effect in that it helps to compensate for tolerance variations in such a way as to prevent buckling and creasing damage to the tape itself during the threading process. When the tape is threaded automatically as described in Ser. No. 66,497 above mentioned, the initial driving force for the leader tip comes from rotation of the reel. In other words, the reel pushes the leader, and must therefore grip it firmly. Resistance in the threading path of the leader causes the leader to tend to slide backward with respect to the impelling reel. Such resistance is initially provided by the stripping mechanism, and the backward sliding action of the leader with respect to the impelling reel, if permitted, would take the form of a retrograde rotation of the leader on the reel. In other words again, if the reel is rotating counterclockwise (FIG. 1) to drive the leader 16, 17 to the right for stripping and threading, the resistance provided by the stripping and threading action tends to cause the portion of the leader that is still wound on the reel to slide rotatingly in a clockwise direction with respect to the reel. Phrased alternatively, the leader tends to slow down or stop, so as the reel rotates counterclockwise with respect to the observer, the leader rotates also counterclockwise (but more slowly) with respect to the observer, but clockwise with respect to the reel. Since the leader is retained on the ledge 31 and is substantially thicker and stiffer than the tape 14, the result is that the tape outer layer is buckled, redoubled, dragged backwardly (i.e., clockwise with respect to the reel), and may be creased, torn, and otherwise damaged. However, the provision of the sloping surface 36 in the groove 32, either in combination with the springy fingers 18 or not, causes a frictional gripping action of the reel on the leader edges sufficient to drive the leader without retrograde slipping. Initial resistance to stripping of a loosely fitting leader causes a circumferential expansion of the coiled portion of the leader, as in an expansion ring type of geometry, such as to wedge the leader firmly against the surface 36 at some point. In an actual construction that has been tested and used, the depth of the groove (axial dimension of wall 31) is 0.027 inches, the axial dimension of wall 33 is 0.020 inches, and the slope height of surface 36 is therefore 0.007 inches. In other words, the wall 36 compensates for tolerance variations of as much as 0.007 inches in the width of the leader or in the axial spacing of the side flanges 13 of the reel.

Figure 6:
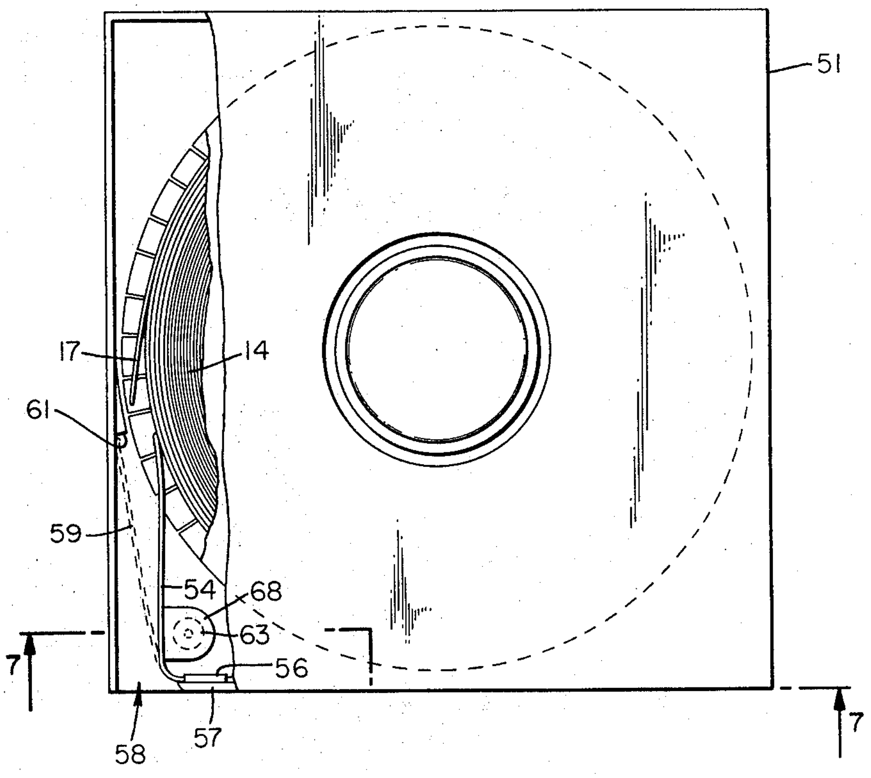
FIG. 6 is a broken-away plan view of an alternative embodiment of the invention.
Figure 7:
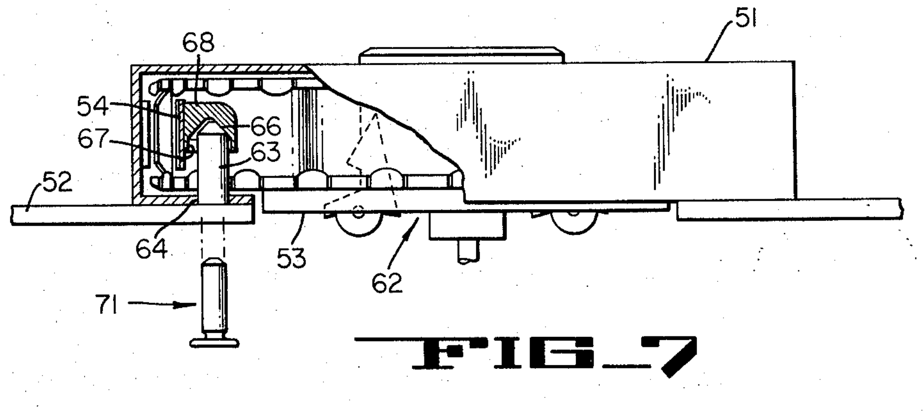
FIG. 7 is an elevational section view taken along the plane of lines 7—7 of FIG. 6.

Referring now to FIGS. 6 and 7, there is shown an alternative embodiment of the invention in which the reel 11 is permanently mounted within a rectangular cartridge housing 51 for greater protection when the reel and housing assembly are separated from the tape transport, the top plate 52 and reel turntable 53 of which are shown in FIG. 7 illustrating the operational mounting of the housing 51 on the transport.

The housing 51 of the cartridge has the additional advantage that it is adapted to foolproof prevention of stripping when the cartridge is off the machine. To realize this advantage, the housing 51 is provided with a resilient stripping finger 54, which is mounted at its base 56 on a solid portion 57 of the housing 51 adjacent the portals of an opening 58 for egress of the tip 17 of the leader when it is stripped. Alternatively, the finger 54 may be of springy plastic, molded integrally with the housing 51. In the non-operational condition (when the cartridge is removed from the machine), the resilient finger 54 occupies a blocking position 59, closing the egress 58 to stripping of the leader tip 17, and the free end of the finger 54 in this position is depressed behind a step portion 61 of the housing to ensure that the tip 17 cannot be stripped.

When the housing 51 is placed on the machine, however, the hub 12 of the reel engages and is positioned by the spindle mechanism 62 and turntable 53 of the transport (more fully described in the above-mentioned Ser. No. 66,497), while the housing 51 is rotationally fixed by a pin 63 extending from the top plate 52 through an opening 64 in the bottom of the housing 51. The pin 63 has a conically tapered cam tip 66 for engaging the finger 54 and urging it to the operational stripping position shown in solid lines in FIG. 6. To avoid blocking the stripping path to egress 58, the pin 63 is positioned on the opposite side of the finger, and in actuality engages a conical cam-follower recess 67 in a block 68 that is attached to the finger 54.

It will be noted that the tip of the stripping finger 54 bears resiliently against the outer coil of the leader in the operative position of FIG. 6. The finger 54 thus acts during rewind mode as a means to ensure that the leader is packed firmly back onto the ledges 31, without being forced or wedged between the ledges, for as shown in FIG. 7, the finger 54 is nearly as wide as the leader and causes the leader to bear substantially solidly against the ledges 31.

When it is desired to strip the leader by hand without mounting it on the transport, as for preparing the cartridge for manual threading on a transport that is not adapted to thread automatically, or for other reasons, the stripping may be performed very easily by inserting the tip of a pencil or other suitable pin or probe into the opening 64 of the housing and engaging the cam follower recess 67 to shift the finger to operative position as in FIG. 3. The hub 12 may then be rotated by hand to strip the leader until it projects from the housing through the egress 58 and can be grasped by hand and pulled further out. A separate plastic plug-type snap-fitting pin 71 may also be provided to move and hold the finger 54 in operative position for such use.

What is claimed is:

1. In a tape retaining reel cartridge of the type including a hub and a pair of side flanges having inwardly turned peripheral lip portions, tape of width less than the axial lip spacing dimension wound upon the hub, and a leader of width greater than the axial lip spacing dimension attached to the outer turn of tape, the improvement comprising:

said peripheral lip portion of each side flange being serrated to define discrete lips having spaces therebetween of arcuate dimension equal to that of the lips; and the lips of the respective side flanges being staggered with respect to one another so that the lips of one side flange axially confront the arcuate spaces between the lips of the other side flange.

2. The combination recited in claim 1, wherein:

said side flanges have radial cuts between the sector of each lip and the sectors of the adjacent arcuate spaces to permit flexing of the lips for stripping of said tape.

3. The combination recited in claim 2, wherein:

said lips are rounded in a circumferential direction and are sloped radially inwardly and toward the opposite side flange to facilitate winding of the leader upon the reel, but present substantially axially directed walls on the radially inward side to oppose stripping of the leader from the reel.

4. The combination recited in claim 3, wherein:

each side flange has a circumferential groove radially inwardly of said lips for retention of said leader;

the bottoms of said grooves in the respective side flanges being spaced apart for a dimension on the order of the width of the leader and being continuous with the inner surface of the side flange in the regions of said angular spaces between said lips;

said axially directed walls of said lips defining the radially outermost side of each of said grooves; and the radially inward side of each of said grooves being defined by an axially directed ledge for holding the leader away from the axis of said reel;

the side flanges radially inwardly from said grooves being axially spaced apart for a dimension greater than said tape width but less than said leader width.

5. The combination recited in claim 4, wherein:

the bottom of each of said grooves is formed to a sloping surface at least in the outward peripheral portion thereof, with said sloping surface sloping radially outwardly and toward the opposite side flange of the reel, so as to ensure frictional gripping of the edges of the leader despite variations in the width thereof or in the axial spacing of the flanges.

6. The combination recited in claim 5, wherein:

said tape is wound to a diameter equal to that of said ledge.

7. The combination recited in claim 6, wherein:

said cuts between said lips and angular spaces are enlarged at the radially inward portions thereof to define a narrowed neck for each of the lip sectors.

8. The combination recited in claim 7, wherein:

each of said narrowed neck portions of the lip sectors being relieved on the radially and axially inward zone thereof to increase the flexibility of said lip sectors.

9. The combination recited in claim 1, and also including:

a housing enclosing said reel and adapted for mounting upon a tape transport with said hub engaged by a spindle and turntable of said transport;

stripping means formed in said housing and adjustable between stripping and non-stripping conditions; and means associated with said transport for engaging and adjusting said stripping means from non-stripping to stripping condition when said housing is mounted on said transport.

10. The combination recited in claim 9, wherein:

said stripping means is a resilient finger biased to a non-stripping position out of the rotational path of said leader tip; and said transport associated means includes a cam pin extending from said transport and presenting a cam face engaging said finger in the mounted position of said housing and urging said finger to a stripping position in which said finger engages said leader tip between said tip and the adjacent coil of said leader;

said finger bearing resiliently against the outer turn of said leader in the stripping position so as to serve as a leader repacking means during the rewind made of said transport.

* * * * *

PO-1050
(5/69)

UNITED STATES PATENT OFFICE

CERTIFICATE OF CORRECTION

Patent No. 3,677,495 Dated July 18, 1972

Inventor(s) WALTER H. VILLIERS and ERNEST B. JOHNSON

It is certified that error appears in the above-identified patent and that said Letters Patent are hereby corrected as shown below:

First page, line 2, change "Villers" to -- Villiers --.

First page, line 4, item [72], change "Villers" to -- Villiers -- .

Signed and sealed this 13th day of November 1973.

(SEAL)
Attest:

EDWARD M.FLETCHER,JR.
Attesting Officer

RENE D. TEGTMEYER
Acting Commissioner of Patents